(12) United States Patent
Huang et al.

(10) Patent No.: US 10,456,873 B2
(45) Date of Patent: Oct. 29, 2019

(54) WELDING WIRE FOR GAS PROTECTIVE WELDING OF REDUCED ACTIVATION MARTENSITIC/FERRITIC STEEL AND METHOD OF MANUFACTURING THE SAME

(71) Applicant: Hefei Institutes of Physical Science, Chinese Academy of Sciences, Hefei, Anhui (CN)

(72) Inventors: Bo Huang, Anhui (CN); Qunying Huang, Anhui (CN); Junyu Zhang, Anhui (CN); Yutao Zhai, Anhui (CN); Chunjing Li, Anhui (CN); Shaojun Liu, Anhui (CN); Yican Wu, Anhui (CN)

(73) Assignee: Hefei Institutes of Physical Science, Chinese Academy of Sciences, Hefei (CN)

( * ) Notice: Subject to any disclaimer, the term of this patent is extended or adjusted under 35 U.S.C. 154(b) by 349 days.

(21) Appl. No.: 14/969,028

(22) Filed: Dec. 15, 2015

(65) Prior Publication Data

US 2017/0008133 A1    Jan. 12, 2017

(30) Foreign Application Priority Data

Jul. 10, 2015  (CN) .......................... 2015 1 0408504

(51) Int. Cl.
*B23K 35/30*       (2006.01)
*B23K 35/40*       (2006.01)
(Continued)

(52) U.S. Cl.
CPC ...... *B23K 35/3026* (2013.01); *B23K 35/0261* (2013.01); *B23K 35/3086* (2013.01); *B23K 35/40* (2013.01); *C21D 1/18* (2013.01)

(58) Field of Classification Search
CPC ............ B23K 35/0261; B23K 35/3028; B23K 35/3088; B23K 35/40; B23K 9/16; C21D 1/18
See application file for complete search history.

(56) References Cited

U.S. PATENT DOCUMENTS

| 3,560,702 A | * | 2/1971 | Arikawa | ............ | B23K 35/3605 |
| | | | | | 219/146.3 |
| 3,645,782 A | * | 2/1972 | Johnson | ............. | B23K 35/3066 |
| | | | | | 148/26 |

(Continued)

FOREIGN PATENT DOCUMENTS

| CN | 101469409 | * | 7/2009 |
| CN | 102615450 A | | 8/2012 |

(Continued)

OTHER PUBLICATIONS

1st OA of counterpart Chinese Patent Application No. 201510408504.1 dated Jun. 28, 2016.

(Continued)

*Primary Examiner* — Ibrahime A Abraham
*Assistant Examiner* — Gyounghyun Bae

(57) ABSTRACT

Welding wire for gas protective welding of reduced activation ferritic/martensitic steel and the manufacturing method, chemical components (weight percentage, wt %): C: 0.10~0.15, Cr: 8.0~9.0, W: 1.0~1.6, V: 0.15~0.25, Ta: 0.10~0.17, Mn: 0.50~0.70, Si: 0~0.05, N: 0~0.02, O, Ni, Cu, Al, and Co: 0~0.01 respectively, P, S, Ag, Mo, and Nb: 0~0.005 respectively, and balance of Fe. The welding wire has Cr equivalent weight of less than 11, Ni equivalent weight of greater than 3.5. It is manufactured with a wire rod through multi-pass drawing. The rod is subject to annealing heat treatment, tempering treatment performed between the passes of drawing. The annealing process is: the rod is at 940~1020° C. for 20~60 minutes, and the n cooled to below (Continued)

650° C. at rate of less than 45° C./hour, air-cooled to room temperature. The tempering process is: the rod is at 760~820° C. for 0.5~2 hours. It reduces forming of δ ferrites in welded joints.

4 Claims, 1 Drawing Sheet

(51) Int. Cl.
*B23K 35/02* (2006.01)
*C21D 1/18* (2006.01)

(56) References Cited

U.S. PATENT DOCUMENTS

| | | | | |
|---|---|---|---|---|
| 3,855,015 | A * | 12/1974 | Nemoto | B21B 27/00 428/683 |
| 4,363,951 | A * | 12/1982 | Shiga | B23K 35/362 219/146.24 |
| 4,529,669 | A * | 7/1985 | Mori | B23K 35/3086 310/52 |
| 5,296,677 | A * | 3/1994 | Takahashi | B23K 35/3086 219/146.23 |
| 5,310,431 | A * | 5/1994 | Buck | C22C 38/52 148/325 |
| 5,853,504 | A * | 12/1998 | Nishimura | B24B 37/14 148/324 |
| 5,944,262 | A * | 8/1999 | Akutagawa | F02M 61/168 239/585.1 |
| 6,940,042 | B2 * | 9/2005 | Hara | B23K 35/3053 219/145.22 |
| 7,074,286 | B2 * | 7/2006 | Klueh | C21D 1/18 148/334 |
| 7,951,469 | B2 * | 5/2011 | Osuki | C22C 19/05 428/683 |
| 2001/0027966 | A1 * | 10/2001 | Iwatsubo | B23K 35/308 219/137 WM |
| 2002/0148533 | A1 * | 10/2002 | Kim | B23K 35/3086 148/24 |
| 2004/0056074 | A1 * | 3/2004 | Sjodin | B23K 35/308 228/183 |
| 2005/0013722 | A1 * | 1/2005 | Usami | B23K 35/3053 420/93 |
| 2006/0024190 | A1 * | 2/2006 | Kelly | B22F 3/225 419/36 |
| 2006/0163231 | A1 * | 7/2006 | Kobayashi | B23K 35/308 219/146.23 |
| 2006/0179974 | A1 * | 8/2006 | Hatano | B23K 35/308 75/228 |
| 2007/0269335 | A1 * | 11/2007 | Usami | B23K 35/3053 420/93 |
| 2008/0173701 | A1 * | 7/2008 | Frankel | B23K 35/0261 228/262.3 |
| 2013/0270246 | A1 * | 10/2013 | Okazaki | B23K 9/025 219/137 WM |
| 2014/0294491 | A1 * | 10/2014 | Nako | B23K 9/23 403/271 |
| 2015/0034605 | A1 * | 2/2015 | Keegan | B23K 9/0026 219/74 |

FOREIGN PATENT DOCUMENTS

| | | |
|---|---|---|
| CN | 104907733 A | 9/2015 |
| JP | 63-273594 | * 11/1988 |
| JP | 01-284497 | * 11/1989 |

OTHER PUBLICATIONS

2nd OA of counterpart Chinese Patent Application No. 201510408504.1 dated Dec. 13, 2016.
3rd OA of counterpart Chinese Patent Application No. 201510408504.1 dated Jun. 2, 2017.
1st search result of counterpart Chinese Patent Application No. 201510408504.1.
Supplementary search result of counterpart Chinese Patent Application No. 201510408504.1.
Notification to Grant Patent Right for Invention of Chinese Patent Application No. 201510408504.1 dated Aug. 30, 2017.
Qunying Huang et al., R&D Status of China Low Activation Martensitic Steel, Chinese Journal of Nuclear Science and Engineering, Mar. 31, 2007, p. 41-49, vol. 27, No. 1.
Hengchun Yang, The TIG Welding of China Low Activation Martensitic Steel and Study on Weld Behavior with Irradiation, Wanfang Database Master's Degree Thesis, Sep. 17, 2014, p. 8.
Jiansheng Qiao et al., The Microstructure and Mechanical Properties of China Low Activation Martensitic Steel Joined by Tungsten Inert Gas Welding, Chinese Journal of Nuclear Science and Engineering, Dec. 31, 2008, p. 354-361, vol. 28, No. 4.

* cited by examiner

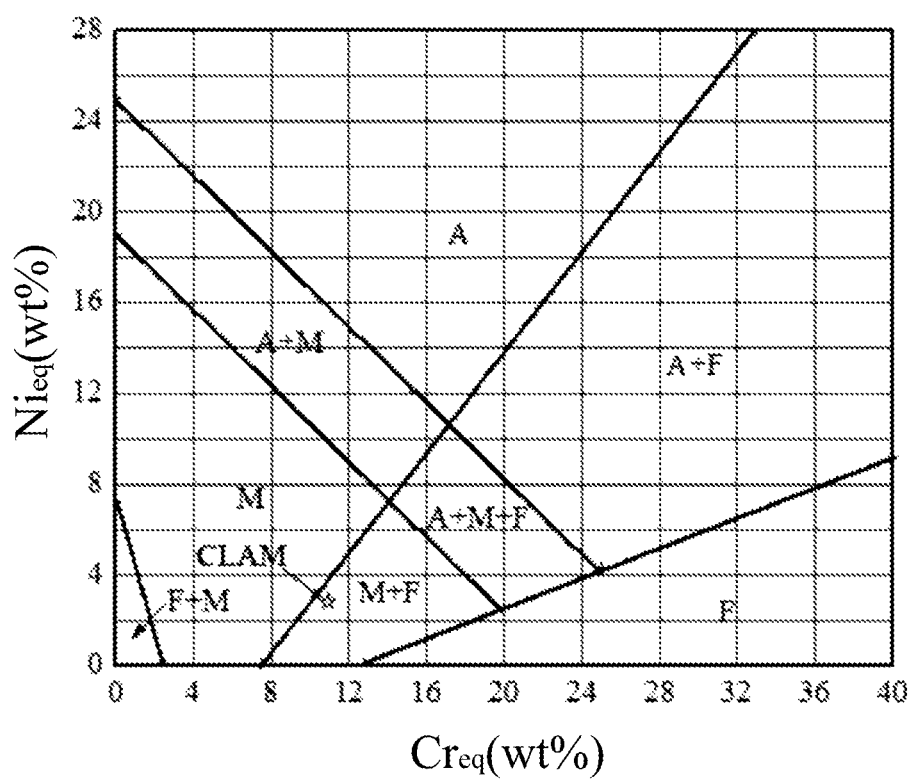

WELDING WIRE FOR GAS PROTECTIVE WELDING OF REDUCED ACTIVATION MARTENSITIC/FERRITIC STEEL AND METHOD OF MANUFACTURING THE SAME

CROSS-REFERENCE TO RELATED PATENT APPLICATION

The present patent application claims benefit of Chinese patent application No. 201510408504.1 filed on Jul. 10, 2015, the entire contents of which are incorporated by reference.

TECHNICAL FIELD

The present invention relates to the technical field of gas protective welding wire for welding, and particularly to a welding wire for gas protective welding of reduced activation ferritic/martensitic steel and a method of manufacturing the same.

BACKGROUND ART

A fusion reactor blanket has to withstand harsh conditions such as 14 MeV high-energy neutron radiation of the reactor core and impact of high-energy density heat flow (>1 MW/m$^2$). The reduced activation ferritic/martensitic (RAFM) steel, which has the merits such as resistance to high-energy neutron radiation, low activation, good performances at a high temperature, is considered as the preferred structural material for the first fusion reactor in the future. China low activation martensitic (CLAM) steel is a kind of RAFM steel, which is developed by Institute of Nuclear Energy Safety Technology, Chinese Academy of Sciences with wide collaboration, obtaining an independent intellectual property right. After being developed for more than ten years, the CLAM steel has been chosen as the preferred structural material of China ITER test blanket module, and is also the preferred structural material of China Fusion Engineering Test Reactor Blanket. In addition, as the environment where the fusion reactor blanket is located is extreme, the blanket structure should be cooled by delivering a lot of coolant into the interior thereof, therefore the blanket structure is also quite complex. The gas protective welding (e.g. Tungsten Inert Gas (TIG) welding and Metal Inert Gas Arc (MIG) Welding) currently has been widely used in the process of welding the blanket structure as it has good welding adaptability.

The chemical components of the CLAM steel are shown in Table 1.

According to formulas (1) and (2), the CLAM steel has the Cr equivalent weight of 11.8 and the Ni equivalent weight of 3.2 by calculation.

Cr equivalent weight: $Cr_{eq}=Cr+6Si+V+5Nb+2.5Ta+1.5W$ (1)

Ni equivalent weight: $Ni_{eq}=Ni+Co+0.3Cu+0.5Mn+25N+30C$ (2)

It can be seen from the Schaeffler-Schneier FIGURE (see FIG. 1) that the CLAM steel has a strong tendency of forming ferrites during the solidification process, and many blocky δ ferrites will exist in the joint if the base material of the CLAM steel is taken as the welding filler material. It is found from research that the generation of the blocky ferrites reduces the strength of welding lines, seriously weakens the impact resistance of the joint, and it will increase the tendency of crystallization cracking and reduce the high-temperature creeping performance, etc. It is proper to say that the existence of the blocky δ ferrites is the fundamental cause to deterioration of the performances of the joint. Therefore, the key technology for improving the performances of the joint is related to how to reduce and even eliminate the δ ferrites in the welding structure. The present invention designs and optimizes the chemical compositions of the welding wire of the CLAM steel through analysis of influence of the elementary compositions on the formation of ferrites.

TABLE 1

| Designed Compositions of the CLAM Steel (wt %) | | | | | | | | |
|---|---|---|---|---|---|---|---|---|
| Element | C | Cr | W | V | Ta | Mn | Si | P | S |
| Content | 0.08~0.12 | 8.5~9.5 | 1.3~1.7 | 0.15~0.25 | 0.12~0.18 | 0.45~0.55 | <0.05 | <0.005 | <0.005 |
| Element | N | O | Ni | Cu | Al | Co | Ag | Mo | Nb |
| Content | <0.02 | <0.01 | <0.01 | <0.01 | <0.01 | <0.01 | <0.005 | <0.005 | <0.005 |

SUMMARY

The objects of the present invention are to provide a welding wire for gas protective welding for RAFM steel and a method and a process of manufacturing such welding wire, and apply such welding wire to the gas protective welding of CLAM steel. The welded joint of fully martensitic structure is obtained in the technical solution of the present invention by reasonably adjusting and controlling the compositions of the alloying elements and contents thereof and reducing the tendency of forming δ ferrites of the welding filler material of CLAM steel.

In order to achieve the above-mentioned objects, the present invention proposes to appropriately reduce the contents of the elements (Cr, W, Ta, etc.) for forming ferrite, while increase the contents of the elements (C, Mn, etc.) for forming austenite, according to the formulas for calculating the equivalent weight of chromium and the equivalent weight of nickel, such that the optimized welding wire tends to form full martensite. Besides, the welding wire manufactured with the wire rod through the cold-drawing process is suitable for automatic and semi-automatic welding, and at the same time an appropriate heat treatment process enables the welding wire to maintain good processing properties.

The embodiment of the present invention is: a welding wire for gas protective welding of RAFM steel has chemical components of weight percentage (wt %) as follows: C: 0.10~0.15, Cr: 8.0~9.0, W: 1.0~1.6, V: 0.15~0.25, Ta: 0.10~0.17, Mn: 0.50~0.70, Si: 0~0.05, N: 0~0.02, O, Ni, Cu, Al, and Co: 0~0.01 respectively, and P, S, Ag, Mo, and Nb: 0~0.005 respectively, and balance of Fe.

In the above, the welding wire has Cr equivalent weight of less than 11, and Ni equivalent weight of greater than 3.5.

In the above, the welding wire is suitable for a gas protective welding of CLAM steel.

The present invention further provides a method of manufacturing a welding wire for gas protective welding of RAFM steel, which method is used to manufacture the above-mentioned welding wire for gas protective welding of RAFM steel. The welding wire is manufactured with a wire rod in a manner of multi-pass drawing. The wire rod is first subject to the annealing heat treatment, and the tempering treatment is carried out between the passes of drawing. The annealing process prior to drawing the wire rod is as follows: the wire rod is kept at 940~1020° C. for 20~60 minutes, and then the wire rod is cooled to below 650° C. at a cooling rate of less than 45° C./hour, and then the wire rod is air-cooled to the room temperature; the tempering process during the process of drawing the wire rod is as follows: the wire rod is air-cooled after the wire rod is kept at 760~820° C. for 0.5~2 hours.

The principle of the present invention lies in:

CLAM steel is enabled to have the tendency of forming full martensites through judgment according to the Schaeffler-Schneier FIGURE, wherein in the condition of ensuring the low activation, the contents of Cr, W, and Ta of the welding wire for gas protective welding of low activation steel are reduced, the contents of C and Mn are increased, and the CLAM steel is controlled to have the Cr equivalent weight of less than 11 and the Ni equivalent weight of greater than 3.5, moreover, it is considered that compositions of the deposited metal of the welding line are well compatible with the compositions of the base material, and the tenacity of the joint is improved.

The alloying elements of the welding wire are adjusted according to the following principles:

Element Cr can improve the oxidation resistance and corrosion resistance of the material, and facilitate to form carbides to serve the function of strengthening precipitation, and Cr is an element for forming ferrite intensely, therefore reducing the Cr content can notably reduce the tendency of the material for forming ferrites;

Element W can improve the temper stability of the material, and the joint has good tenacity when the content of W is about 1%;

Element C is the most sensitive element to weldability, and has quite great influences on the impact resistance; besides, C is a strong austenite stabilizing element, and the ferrite-forming tendency can be reduced by improving the content of C.

Element Mn can notably improve the tenacity of the joint if the content of Mn is more than the upper limit content of the base material, while may affect the Ac1 temperature and the corrosion resistance of the material if the content of Mn is too high.

Upon analysis and calculation, the designed components of the welding wire for CLAM steel (weight percentage, wt %) are as follows (see Table 2):

(1) To meet the requirement of low activation and a relatively low content of impurities, the various elements are controlled in the ranges as follows:

the content of N is 0~0.02; the contents of O, Ni, Cu, Al, and Co each are 0~0.01; the contents of P, S, Ag, Mo, and Nb each are 0~0.005;

(2) In order to reduce the Cr equivalent weight of CLAM steel and improve the tenacity of the joint, the elements are controlled as follows:

The content of Cr is 8.0~9.0, the content of W is 1.0~1.6, and the content of Ta is 0.10~0.17;

(3) To increase the Ni equivalent weight of CLAM steel, the elements are controlled as follows:

The content of C has is 0.10~0.15, and the content of Mn is 0.50~0.70;

(4) To ensure the compatibility with the components of the base material, other elements are substantially consistent with the base material:

For example, V: 0.15~0.25, Si: 0~0.05.

TABLE 2

| Designed Components of Welding Wire of CLAM Steel (wt %) | | | | | | | | |
|---|---|---|---|---|---|---|---|---|
| Element | C | Cr | W | V | Ta | Mn | Si | P | S |
| Content | 0.10~0.15 | 8.0~9.0 | 1.0~1.6 | 0.15~0.25 | 0.10~0.17 | 0.50~0.70 | <0.05 | <0.005 | <0.005 |
| Element | N | O | Ni | Cu | Al | Co | Ag | Mo | Nb |
| Content | <0.02 | <0.01 | <0.01 | <0.01 | <0.01 | <0.01 | <0.005 | <0.005 | <0.005 |

The present invention provides a method of manufacturing the above-mentioned welding wire for gas protective welding of RAFM steel. The welding wire is manufactured with a wire rod in a manner of multi-pass drawing.

The wire rod is first subject to annealing heat treatment, and the tempering treatment is carried out between the passes of drawing. The annealing process prior to drawing the wire rod is as follows: the wire rod is kept at 940~1020° C. for 20~60 minutes, and then the wire rod is cooled to below 650° C. at a cooling rate of less than 45° C./hour, and then the wire rod is air-cooled to the room temperature; the wire rod is subject to the tempering treatment between each two passes of drawing, and the tempering process used is as follows: the wire rod is kept at 760~820° C. for 0.5~2 hours.

The CLAM steel under the normal heat treatment has a tempered martensitic structure which has a high strength and a low extensibility, and is difficult to process. The annealing treatment prior to drawing the wire rod can effectively improve the plasticity of the material to enable the wire rod of CLAM steel to obtain a fully ferritic structure, such that it has a reduced tensile strength and good plasticity. Besides, the welding wire is drawn a plurality of times during the cold-drawing process with its diameter reduced each time until reaching the desired size. Strong hardening and strengthening will occur to the wire material during the drawing process, and the wire material is subject to the tempering heat treatment between each two passes of drawing so as to reduce the strength and recover the plasticity. The method of manufacturing a welding wire provided in the present invention effectively reduces the risk that the wire material of CLAM steel breaks during the drawing process.

The welding wire of the present invention is delivered in the status as follows: it is annealed, having a smooth surface without flaws such as burr, scratch, corrosion, and oxide scale. The wound welding wire should be suitable for continuously feeding the wire onto an automatic welder and a semi-automatic welder. The deposited metal obtained from the welding wire provided in the present invention can control the content of δ ferrites in the CLAM steel joint below 0.5%, and the content of impurities of the deposited metal can meet the restriction requirements in Table 3.

TABLE 3

Requirements to Contents of Non-metal Impurities in Deposited Metal of Welding the CLAM Steel

| | Type | | | | | | | |
|---|---|---|---|---|---|---|---|---|
| | Category A | | Category B | | Category C | | Category D | |
| | Thin | Thick | Thin | Thick | Thin | Thick | Thin | Thick |
| Level | ≤0.5 | ≤0.5 | ≤1.0 | ≤0.5 | ≤0.5 | ≤0.5 | ≤1.0 | ≤0.5 |

Compared with the prior art, the advantages of the present invention lie in:

(1) Before the present invention is proposed, the welding wire used in gas protective welding of CLAM steel is manufactured mainly through linear cutting of the base material. With respect to the base material, the present invention reduces the tendency of forming ferrites of the deposited metal of the joint, and can improve the mechanical properties of the joint.

(2) Compared with the linear cutting of the welding wire, the process for manufacturing a welding wire used in the present invention can be suitable for manufacturing the welding wire used in automatic and semi-automatic welding, improving the surface cleanliness of the welding wire and the homogeneity of the welding wire, and ensuring the stability of the welding process and the reliability of the joint.

BRIEF DESCRIPTION OF DRAWING

FIG. 1 is a Schaeffler-Schneier FIGURE, showing the tendency of forming ferrites of CLAM steel.

DETAILED DESCRIPTION OF EMBODIMENTS

Example 1

A solid welding wire for gas protective welding of CLAM steel is subject to vacuum melting, and the welding wire, with the diameter of 1.2 mm, has the main chemical components of weight percentages as shown in Table 4. The structure of the deposited metal of its joint is fully martensitic. It has the Cr equivalent weight of 9.2, and the Ni equivalent weight of 4.4.

TABLE 4

Chemical Components of Welding Wire in Example 1 (wt %)

| C | Co | Cr | Cu | Mn | Mo | Ta | Al | Nb |
|---|---|---|---|---|---|---|---|---|
| 0.143 | 0.0048 | 8.130 | 0.0050 | 0.57847 | 0.0044 | 0.130 | 0.0038 | 0.0048 |

| Ni | P | S | Si | V | W | Ag | O | N |
|---|---|---|---|---|---|---|---|---|
| 0.0068 | 0.0044 | 0.0033 | 0.0494 | 0.194 | 1.413 | 0.0038 | <0.005 | <0.02 |

Example 2

A solid welding wire for gas protective welding of CLAM steel is subject to vacuum melting, the welding wire in the diameter of 1 mm. The welding wire has the main chemical components of weight percentages as shown in Table 5. The structure of the deposited metal of its joint is fully martensitic. It has the Cr equivalent weight of 9.14, and the Ni equivalent weight of 3.9.

TABLE 5

Chemical Components of Welding Wire in Example 2 (wt %)

| C | Co | Cr | Cu | Mn | Mo | Ta | Al | Nb |
|---|---|---|---|---|---|---|---|---|
| 0.121 | 0.0048 | 8.320 | 0.0045 | 0.624 | 0.0036 | 0.140 | 0.0033 | 0.0043 |

| Ni | P | S | Si | V | W | Ag | O | N |
|---|---|---|---|---|---|---|---|---|
| 0.0087 | 0.0036 | 0.0038 | 0.0462 | 0.202 | 1.315 | 0.0042 | <0.005 | <0.02 |

What is claimed is:

1. A welding wire for gas protective welding of reduced activation ferritic/martensitic steel, comprising of: a welding wire having chemical components of weight percentages (wt %) of C: 0.10~0.15, Cr: 8.0~9.0, W: 1.0~1.6, V: 0.15~0.25, Ta: 0.10~0.17, Mn: 0.50~0.70, Si: 0~0.05, N: 0~0.02, O, Ni, Cu, Al, and Co: 0~0.01 respectively, P, S, Ag, Mo, and Nb: 0~0.005 respectively, and balance of Fe.

2. The welding wire for gas protective welding of reduced activation ferritic/martensitic steel according to claim 1, characterized in that the welding wire has Cr equivalent weight of less than 11, and Ni equivalent weight of greater than 3.5.

3. The welding wire for gas protective welding of reduced activation ferritic/martensitic steel according to claim 1, characterized in that the welding wire is suitable for gas protective welding of China low activation martenstitic steel.

4. A method for manufacturing a welding wire for gas protective welding of reduced activation ferritic/martensitic steel, the method used for manufacturing the welding wire for gas protective welding of reduced activation ferritic/martensitic steel according to claim 1, characterized in that the method comprising:

manufacturing the welding wire with a wire rod in a manner of multi-pass drawing, wherein the manufacturing comprises:
making the wire rod first subject to annealing heat treatment; and
carrying out a tempering treatment between passes of drawing,
wherein an annealing process prior to drawing the wire rod is as follows: the wire rod is kept at 940~1020° C. for 20~60 minutes, and then the wire rod is cooled to below 650° C. at a cooling rate of less than 45° C./hour, and then the wire rod is air-cooled to a room temperature; a tempering process during a process of drawing the wire rod is as follows: the wire rod is air-cooled after the wire rod is kept at 760~820° C. for 0.5~2 hours.

* * * * *